Patented May 7, 1940

2,199,535

UNITED STATES PATENT OFFICE 2,199,535

TYPEWRITING MACHINE

Charles H. Beiderbecke, Rochester, N. Y., assignor to International Business Machines Corporation, New York, N. Y., a corporation of New York Application February 25, 1937, Serial No. 127,684

21 Claims. (Cl. 197—126)

This invention relates to continuous billing machines.

The primary object of the invention is to provide an improved billing machine.

Another object is to provide an improved platen raising mechanism.

A further object is to provide an improved forms-carrier device which is lighter in weight and hence easier to manipulate than prior devices of this nature.

An object is to provide a simple and efficient severing knife for the continuous forms.

A further object is to provide an improved leading edge gage for fanfold billing machines which is very much simpler than those heretofore used.

Another object is to provide a continuous billing attachment suitable for use in conjunction with power operated typewriting machines.

An object is to provide a combined form severing knife and paper bail which is locked in normal position and which may be released and moved from its normal position for convenience in arranging the forms.

An object is to provide an improved carbon carrier.

Another object is to provide improved form aligning means.

Various other objects, advantages, and features of the present invention will be particularly pointed out in the following description and claims, or will be apparent from a study thereof and of the accompanying drawings.

The present invention, for convenience in description, is illustrated in the drawings as applied to the well known "International" electric writing machine, formerly known as the "Electromatic"; however, it will be understood that the invention is not limited in its application to the particular form of power operated typewriter appearing in the drawings, but may be applied to other typewriting machines, whether manually or power operated.

Figure 1:
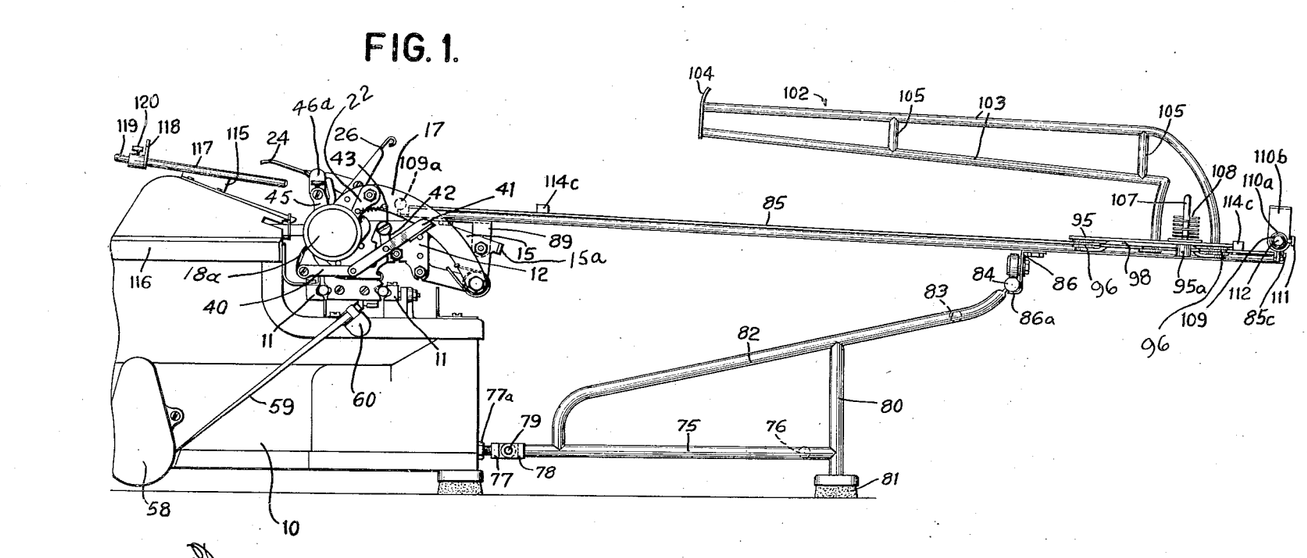
Fig. 1 is a right side elevation of a portion of a power operated typewriting machine embodying the present invention.
Figures 2, 12:
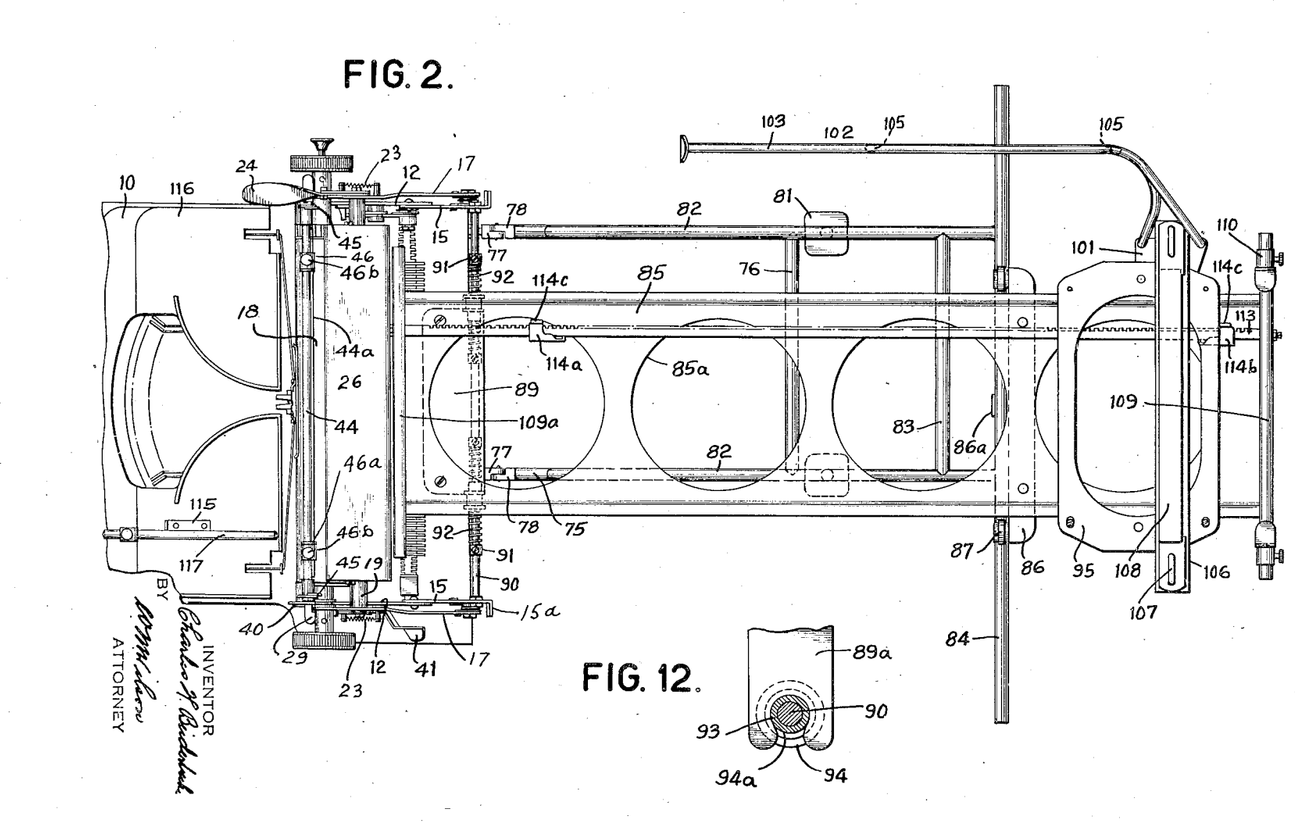
Fig. 2 is a plan view of the parts shown in Fig. 1.
Fig. 12 is a vertical section on line 12—12 in Fig. 3.

The typewriter is generally designated 10 in Figs. 1 and 2 of the drawings and has the usual carriage guiding rails 11 on which is mounted the carriage consisting of end plates 12 (Figs. 3 to 5) which are rigidly joined by a channel-shaped member 13 which formed with two grooves co-operating with grooves in the rails 11 and the usual carriage guiding rollers 14 whereby the carriage is movable for letter spacing in the usual way. Secured to the rear edges of end plates 12 are plates 15 which extend rearwardly of the machine to a point just above the back edge of the machine. Pivoted on studs 16 carried by the plates 15 is a pair of arms 17 which curve upwardly and forwardly (Fig. 4) and rotatably support the platen generally designated 18 which is of usual construction.

The arms 17 are rigidly joined together above and slightly in the rear of the platen 18 by means of a tube 19 (Fig. 3) which may be secured to the arms 17 by any suitable means, such as welding, brazing, or soldering. Secured to each of the plates 12 is an adjustable plate 20 which has a latch lug 20a. A rod 21 is rotatably mounted in both arms 17 within the tube 19 and at each end of this rod is secured a latch 22 having a hook-shaped portion 22a engaging the lugs 20a so as to hold the platen in the normal position of Fig. 4. Springs 23 connected to the latches 22 and to pins carried by the arms 17 hold the latches in engagement with the lugs 20a. Loosely mounted on the rod 21 at the left-hand end of platen between the left-hand arm 17 and the adjacent latch 22, is a hand lever 24 having a pin 24a in the plane of latch 22. When the lever 24 is raised by hand, the pin 24a, cooperating with the left-hand latch 22 rocks rod 21 and both latches to disengage the hook portions 22a from the lugs 20a thereby permitting the platen to be raised to the position shown in Fig. 5.

Figures 4, 5:
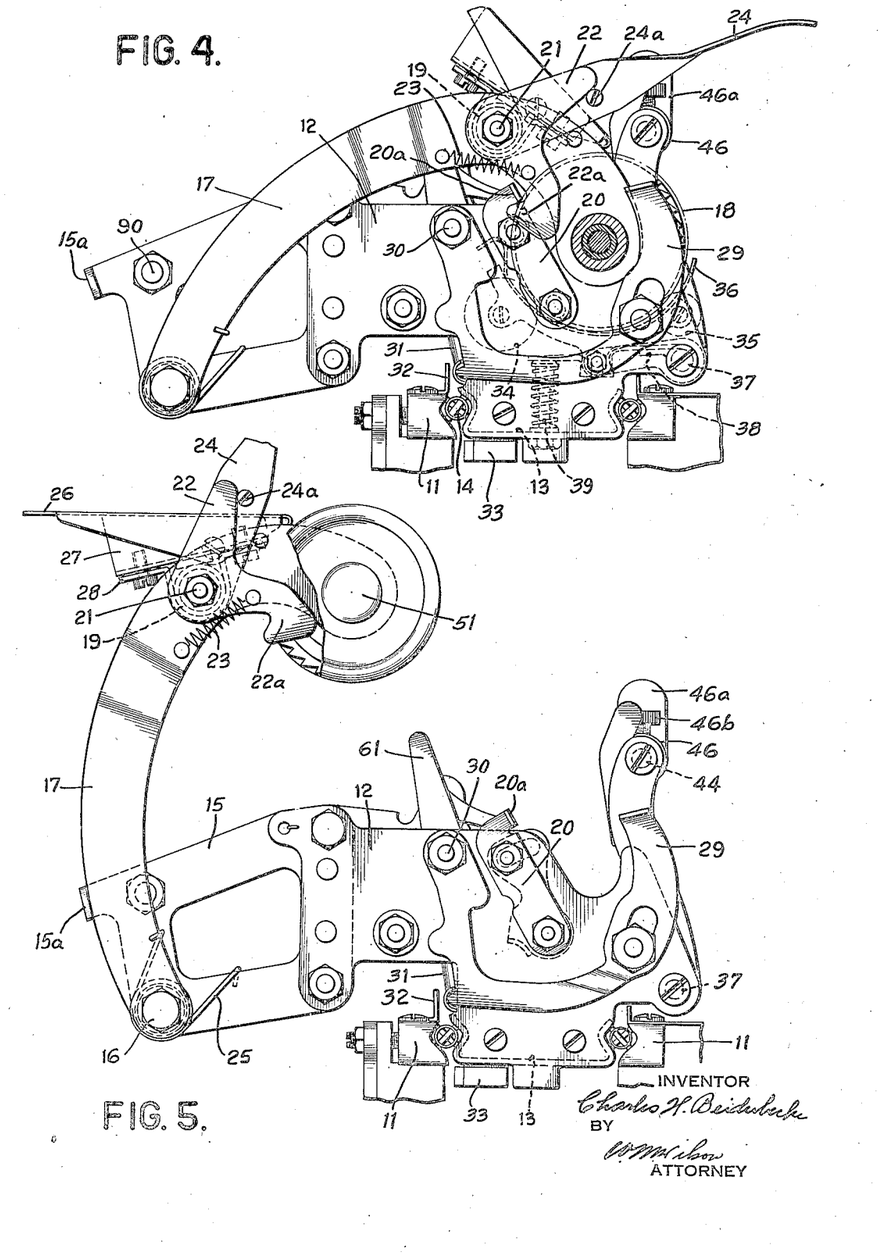
Fig. 4 is a view of the left-hand end of the carriage with the platen in normal position.
Fig. 5 is a similar view showing the platen in elevated position.

Torsion springs 25 are hooked around the edges of plates 15 and arms 17 and serve to counterbalance the weight of the platen and other parts carried by the arm 17 so as to reduce the effort required to lift the platen and move it to the position of Fig. 5. The platen moves upwardly and rearwardly and is limited in its rearward movements by stop lugs 15a formed in the plates 15 and the springs 25 are of sufficient strength to hold the platen in elevated position. A paper table 26 mounted on brackets 27 at each end of the paper table is clamped to the tube 21 by means of straps 28 which partly surround said tube. The surface of the paper table is approximately tangent to the surface of the platen.

The usual carriage release levers 29 (Figs. 3 to 5) are provided at each end of the platen and are pivoted at 30 to the plates 12. These levers cooperate with a bail 31 which in turn cooperates with a lug 32 on a small lever which releases the escapement pawls from the escapement rack 33 whenever either of the levers 29 is depressed. Cooperating with the platen 18 are the rear paper feed rollers 34 (Fig. 4) and the front paper feed rollers 35 which are mounted on the curved paper deflector 36. A rod 37 is pivoted on the plates 12 and at its mid-point has secured thereto an arm 38 which supports the paper deflector 36. A spring 39 interposed between the channel-shaped member 13 and the end of arm 38 presses the paper deflector 36 and hence the feed rollers 34 and 35 up against the platen.

At the right hand end of the carriage (Figs. 1 to 3) an arm 40 is secured to the rod 37. Feed roller release lever 41 is pivoted to the end of arm 40 and to a link 42 which in turn is pivoted at 43 to the right-hand plate 12. When the lever 41 is pulled forwardly by the operator of the machine, the rod 37 is rocked counterclockwise in Fig. 4, depressing the arm 38 against the tension of spring 39, thereby disengaging the feed rollers 34, 35 from the platen. The lever 41 and link 42 together act as a toggle which lock the assembly comprising the paper deflector 36 and feed rollers 34 and 35 in released position.

Figure 3:
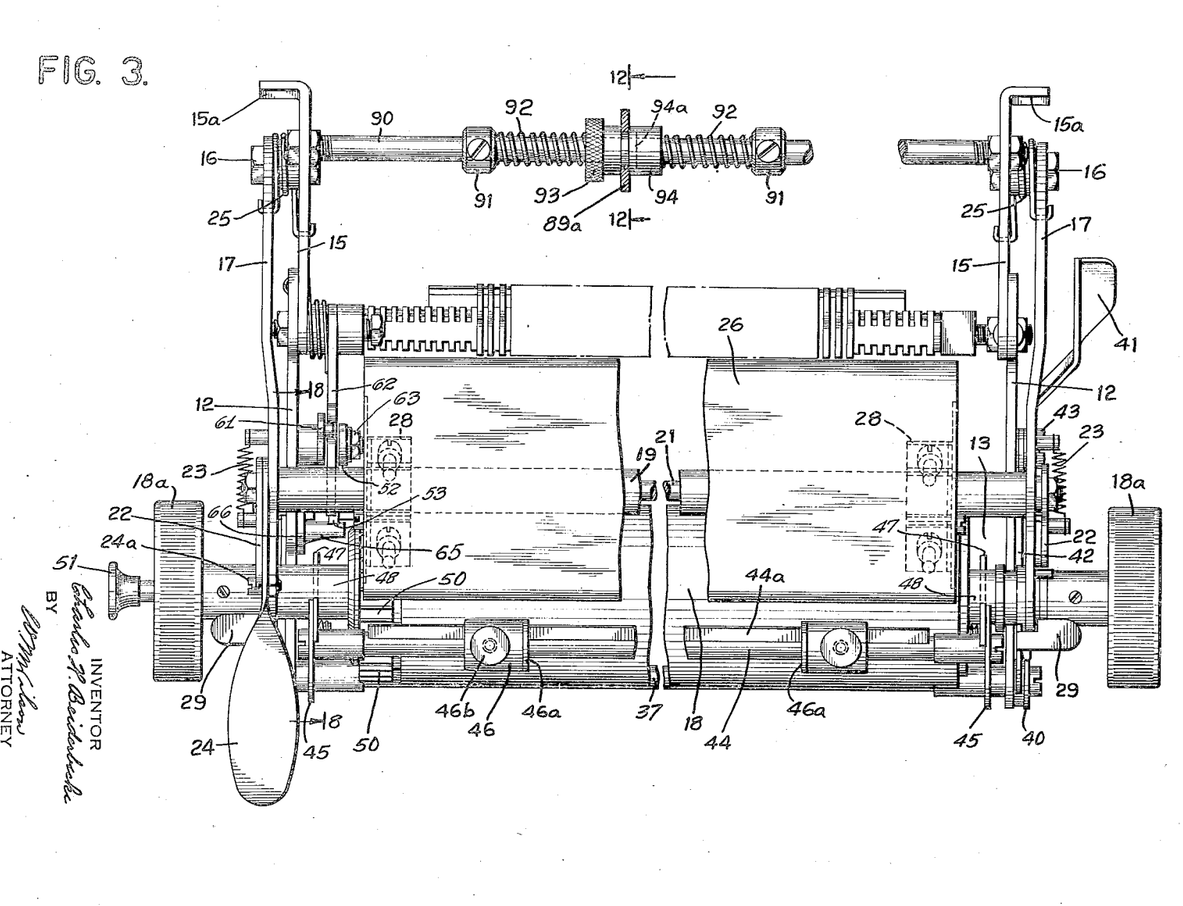
Fig. 3 is a plan view of the carriage on a larger scale than Fig. 2 and shows the platen raising mechanism and other parts mounted on the carriage of the typewriter.
Figure 7:
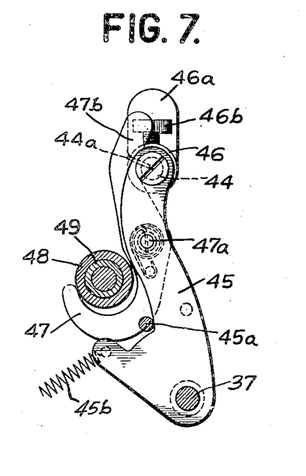
Fig. 7 is an elevation of the left-hand end of the paper bail and severing knife.

The paper bail and severing knife consists of a rod 44 secured to two arms 45 pivotally mounted on the rod 37 adjacent the plates 12. The rod 44, as best shown in Fig. 3, is provided with a rib 44a which extends upwardly and rearwardly fairly close to the platen 18 and serves as a knife edge for severing the forms after they have been typed, the forms usually being provided with perforations to facilitate the separation of the sets from each other after the typing operations have been completed. Slidably mounted on rod 44 is a pair of paper guides consisting of a hub 46 to which is secured an upwardly extending arm 46a, best shown in Fig. 7, the hub 46 being slotted to accommodate the rib 44a and provided with a thumb screw 46b whereby the paper guides may be adjusted along the rod 44. These guides are so disposed that the vertical members 46a are set face to face in order to guide the edges of a pack of continuous forms on the platen.

When the platen is in normal position the paper bail is held in close proximity to the platen by means of hook-shaped latches like 47 (Fig. 7) which partly surround sleeves like 48. The left-hand sleeve 48 (Fig. 3) is loosely mounted on a tube 49 which is part of the left-hand end of the platen. The right-hand sleeve 48 is mounted on a stub shaft forming a part of the right-hand end of the platen. Each latch 47 is pivotally mounted at 47a on one of the arms 45 and is provided with a finger piece 47b. By pressing both finger pieces rearwardly, or to the left with reference to Fig. 7, the hook-shaped portion is swung downwardly and to the right, permitting the paper bail to be swung forwardly, or to the right in Fig. 7, to facilitate the straightening of forms on the platen in the event they become askew or out of registry. This movement of the bail is limited by pins 45a on plates 12 and is resisted by a spring 45b which tends to hold the bail in latched position.

Figure 8:
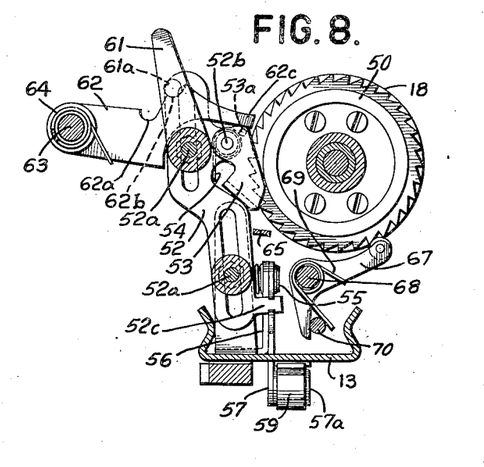
Fig. 8 is a vertical section on the line 8—8 in Fig. 3.

Located at the left-hand end of the platen is the usual line spacing ratchet 50 which normally is clutched to the platen 18 whereby the platen will be rotated by the line spacing mechanism, but may be declutched from the platen by means of the usual release button 51 for the purpose of rotating the platen 18 independently of the line spacing ratchet 50 by means of the usual knobs 18a (see Fig. 3). The line spacing mechanism is substantially the same as the one disclosed in Patent No. 1,957,322, but has been modified to permit the platen to rise without interference with the line spacing mechanism. The line spacing mechanism is shown in Fig. 8. Slidably mounted on studs 52a carried by the left-hand plate 12 is a plate 52 to which is pivoted on a stud 52b the line space pawl 53. The pawl has a lug extending to the right into the plane of the ratchet 50 and is urged in a counterclockwise direction by means of a torsional spring 54 surrounding the stud 52b for the pawl 53. The pawl 53 has a pin 53a which, by engaging plate 52, serves to limit counterclockwise movement of the pawl 53 whereby, when the platen is in raised position, the pawl will be unable to rise above substantially a horizontal position. Pivoted at 55 in a bracket 56 secured to the channel-shaped member 13 is a bell crank 57 having one arm extending horizontally toward the left-hand side of the carriage, or forwardly as viewed in Fig. 8, and provided with a slot loosely engaging a lug 52c formed in the plate 52. The other arm of the bell crank 57 extends downwardly through an opening in the member 13 and is provided with a pulley 57a.

Referring to Fig. 1, the reference numeral 58 designates generally the usual carriage return mechanism which is substantially the same as the one described in Patent No. 1,753,450. A tape 59, connected to a tape drum (not shown) forming part of the carriage return mechanism, is lead upwardly over a pulley carried by bracket 60 and thence longitudinally of the member 13 over the pulley 57a and is anchored to the underside of the member 13. When the carriage return key is depressed, the tape 59 is wound on the tape drum and initially rocks the bell crank 57 in a fashion to depress the horizontal arm thereof and thereby draw down the slide 52. This causes the lug on pawl 53 to move into engagement with the teeth of the ratchet 50 and rotate the platen an increment depending upon the setting of the usual line space control lever 61.

This lever is pivoted on one of the studs 52a and has a pin 61a engageable with either of two notches 62a, 62b formed in an arm 62 pivoted on a stud 63 carried by the left-hand plate 12. A torsion spring 64, surrounding the stud 63 and hooked into a hole in the plate 12 and the edge of the arm 62, respectively, normally presses said arm upwardly into engagement with the pin 61a.

The arm 62 has a forwardly projecting stop portion 62c which is in the plane of the pawl 53 and thereby has the effect of limiting the upward or return movement of the slide 52. The notches 62a and 62b are disposed different radial distances from the stud 52a whereby the amount the plate 52 can return is adjustable. When the pin 61a is in the notch 62b, the pawl 53 will only be permitted to rotate the platen one line space, whereas when the pin is in the notch 62a, the pawl will rotate the platen two line spaces The downward movement of the plate 52 is limited both by a lug 65 formed in an adjustable plate 66 secured to the left-hand plate 12 and by engagement of the plate 52 with member 52a. The lug 65 has the effect of camming the lug on pawl 53 in a direction towards the axis of the platen and thereby prevents overthrow of the platen during the line spacing operation, the effect of the lug being to jam the pawl deeper into the teeth of the ratchet. The usual alining lever 67 is provided and is pivoted on a stud 68 carried by the left-hand plate 12. This alining lever has a roller engaging the teeth of ratchet 50 and is urged into engagement with the ratchet by means of a torsion spring 69 surrounding said stud and hooked around one arm of the lever and around a stop pin 70 carried by the plate 12. When the platen is raised, the stop pin 70 prevents the alining lever 67 from rotating in a counterclockwise direction to follow the movement of the platen.

Figure 6:
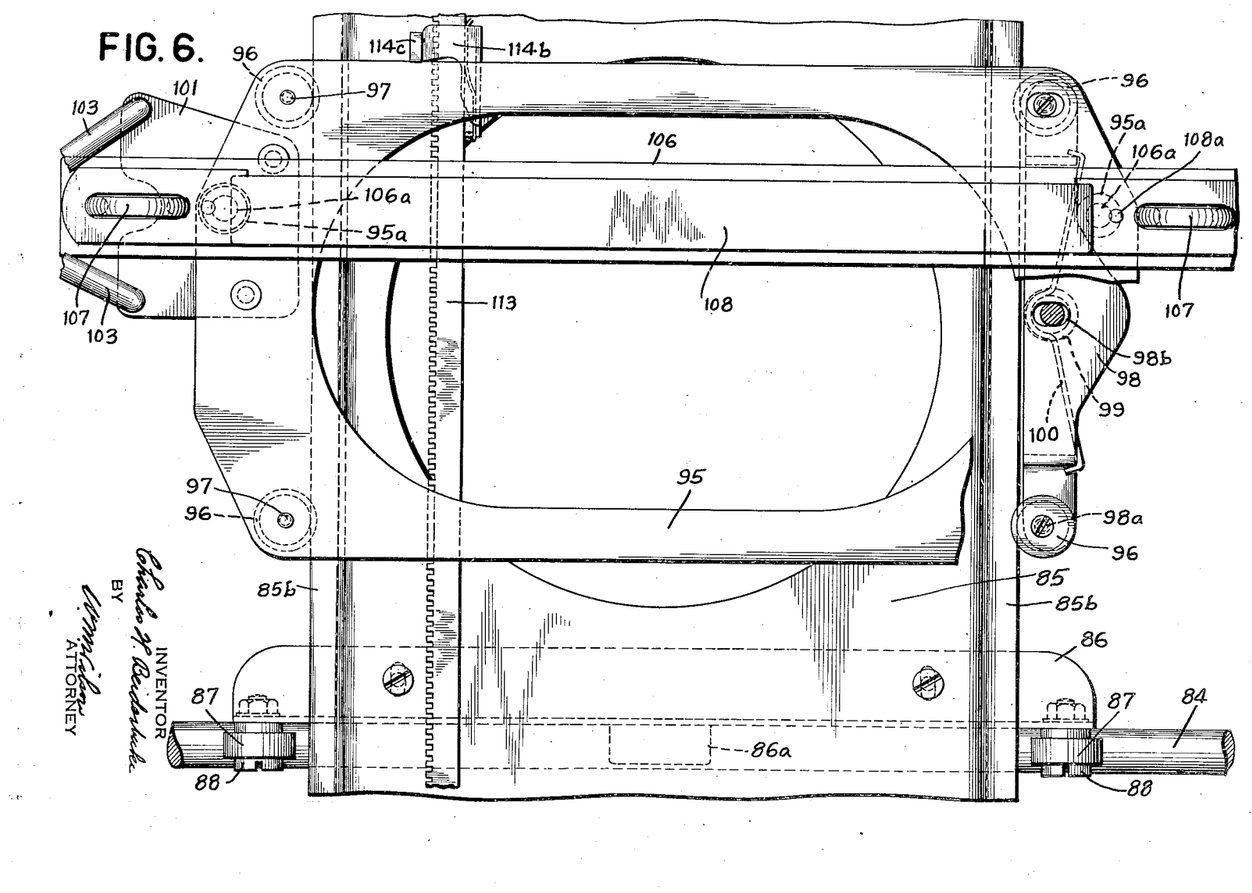
Fig. 6 is an enlarged plan view of an enlarged plan view of the carbon sheet carriage and a portion of the frame work of the forms carrier.
Figure 11:
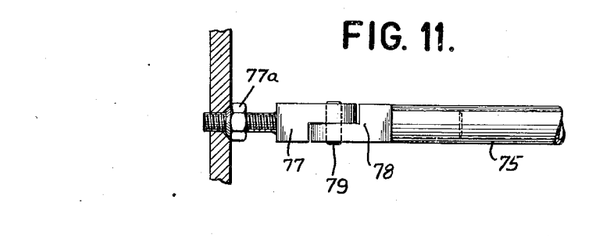
Fig. 11 is a plan view on a large scale of certain parts appearing in Figs. 1 and 2.

The forms carrier is shown in Figs. 1, 2, and 6. It consists, generally speaking, of a suitable supporting framework on which is mounted a form supporting carriage connected to the typewriter carriage so as to be movable therewith, and a carbon shifting carriage movable on the carrier forwardly and rearwardly of the typewriter carriage. The supporting framework comprises two horizontal tubular members 75 joined at their rear ends by the tubular member 76. At their front ends the members 75 are pivoted to the frame of the typewriter to permit detachment of the frame of which the members 75, 76 are part. This pivotal connection is shown in Fig. 11 and consists of two pairs of studs 77, 78, the studs 77 being screwed into the base of the typewriter while studs 78 are secured in the front ends of the tubes 75. Both of the studs 77, 78 are milled flat vertically and to one of them is riveted a pin 79 loosely entering a hole in the other stud. By springing the forward ends of the members 75 apart, the pins 79 may be freed from their holes to permit detachment of the supporting frame for the forms carrier in the typewriter.

In fabricating the framework of which members 75 are part, slight misalignments are likely to occur. In order to correct this misalignment, the shanks of the studs 77 are made long enough to accommodate nuts 77a whereby the studs may be rotated enough to align the supporting framework of the forms carrier with the typewriter and locked by means of nuts 77a. Since studs 78 are incapable of rotation, studs 77 should be given one or more full turns and not rotated a fraction of a turn except to correct for slight inclination of the pins 79 with respect to the horizontal. By making the detachable connection adjustable, it is unnecessary to use precision in fabricating the supporting framework of the forms carrier.

The rear ends of members 75 are secured to vertically extending tubular members 80, the lower ends of which are provided with rubber support pads 81 similar to those with which typewriters are usually provided. Two tubular members 82, which are reversely curved, are secured to the forward ends of the members 75 and to the upper ends of the members 80, and the tubular members 82 are further joined near their rear ends by a horizontal member 83. The members 82 extend rearwardly a substantial amount beyond the vertical members 80 and curve upwardly slightly to a point a little below the level of the platen 18. At this point, a rail 84 in the form of a round rod is secured to the members 83 for the purpose of supporting and guiding the forms supporting carriage.

The forms supporting carriage consists of a plate 85 which, for sake of lightness, is cut out circularly in several places as at 85a. Secured to the underside of the plate 85, as best shown in Fig. 6, is a member 86 which is L-shaped in section. Member 86 extends beyond the longitudinal edges of the plate 85 and is provided with rollers 87 on studs 88, which rollers rest on the top of the rail 84. At its forward end the plate 85 is provided with a bracket 89 having two downwardly depending arms which are detachably secured to the typewriter carriage. For this purpose, there is provided a rod 90 (see Figs. 3 and 4) joining the plates 15. On this rod are two pairs of collars 91 between each pair of collars is a pair of springs 92, a shouldered bushing 93, and a collar 94 having an internal annular recess 94a, best shown in Fig. 3. The springs 92 urge the knurled bushing 93 and the recessed collar 94 toward each other, whereby the shouldered portion of the bushing 93 is held in the recess in the collar 94. The arms 89a of the bracket 89 (as shown in Fig. 12) are so shaped at their lower ends as to provide a circular portion adapted to partly surround the shoulder on the sleeve 93, but open at the bottom to permit the shaft 90 to pass into the relatively larger portion surrounding the bushing 93. When it is desired to detach the forms supporting carriage from the typewriter carriage, it is merely necessary to grasp the knurled sleeve 93 with one hand and move it toward the nearest plate 15 far enough to withdraw with the other hand the shouldered portion of said sleeve from recess 94a the larger part of and the opening in the arm 89a engaged by the sleeve.

In order to prevent the forms supporting carriage 85 from being accidentally lifted from the rail 84 while this carriage is connected to the typewriter carriage, the member 86 (Figs. 1 and 6) is formed with a lug 86a which extends forwardly underneath the rail 84, but does not bear directly against the rail, whereby the carriage 85 is freely movable.

The carbon shifting carriage is best shown in Fig. 6 and consists of an elongated plate 95 provided with four grooved rollers 96 which engage the longitudinal edges of the plate 85. The left-hand pair of rollers 96 is mounted on studs 97 riveted to plate 95. The right-hand rollers 96 are mounted on studs 98a riveted to the ends of a carrier 98. The latter is provided with an oval opening 98b through which passes a stud 99 riveted to the under side of plate 95. The slot 98b is of such proportions that the carrier 98 is free to have a rocking motion in a horizontal plane with respect to the plate 95 and also is bodily movable away from the edges of the plate 95. The studs 98 are guided by oval holes in plate 95 which are of such length as to prevent rollers 96 from leaving the track formed by the flanges 85b. A bow spring 100 has its opposite ends engaging the edges of the carrier 98 while at its mid-point it is curved around a shoulder formed in the stud 99 and has a tendency to move the carrier 98 toward the edge of plate 85 so as to keep both the right-hand rollers 96 in engagement with the edge of the plate.

In order to impart stiffness to the plate 85 and at the same time avoid using relatively heavy gauge metal, the edges of the plate 85 are bent upwardly and outwardly with respect to the longitudinal axis of the plate so as to form flanges 85b and it is with the edges of these flanges 85b that the rollers 96 cooperate.

At the left-hand rear corner of the plate 95 there is secured a plate 101 which is part of an operating handle generally designated 102 in the drawings. This operating handle is composed of two tubular members 103 which are disposed generally longitudinally of the plate 85 and are curved downwardly and to the right (Figs. 1, 2, and 6) to the top surface of plate 101 to which the members 103 are secured in any suitable manner, as by welding or soldering. The members 103 converge slightly toward the typewriter and at their forward ends are secured to a plate 104 which acts as piece by means of which the operator can push the carbon stripper carriage rearwardly of the machine for the purpose of stripping the carbons after a set of forms has been typed. The members 103 are joined together vertically by means of two short tubular members 105.

Removably mounted on the carbon shifting carriage 95 is a bar 106 having riveted thereto, adjacent its ends, pins 106a which project downwardly into bushings 95a secured to the plate 95. By this means, the bar 106, the carbon blades supported thereby, and the forms interleaved with the carbon sheets may be removed from the carriage as a unit. Secured to the top surface of the bar 106 are two posts 107 which are for the purpose of removably supporting the carbon anchoring blades 108.

Two forms of carbons blades 108 are provided: one form, which is used for continuous superposed separate webs and provided with slots at both ends which are slipped over both the posts 107; while the other form is used with fanfolded forms and is slotted at only one end. This latter type is the one illustrated in Fig. 6, from which it will be noted that the blades are stacked on the posts 107 alternately so that the free end of one blade terminates short of the post on which the blade above or below is mounted. When the machine is used for typing fanfold forms, the blades 108 project between the folds and serve as an anchorage for a carbon sheet, the carbon sheet being formed with a suitable loop into which the blade extends.

In order to prevent as much as possible the blades 108 from resting upon the forms and thereby impeding free movement of the carbon shifting carriage during the process of stripping the carbon sheets from the typed forms, the blades 108 are provided with low studs 108a which serve to space the blades apart sufficiently as shown in Fig. 1 to allow the edges of the webs to work free between the blades.

The rear end of the plate 85 is turned upwardly at 85c and fits in a slot in a tube 109 (see Fig. 2) secured to the plate 85 by any suitable means. Slidably mounted on the tube 109 is a pair of side guides 110, each consisting of a hub 110a to which is secured an L-shaped guide member 110b. A thumb screw 111 having its shank extending through a hole in the hub and a slot cut in the end of tube 109, is threaded into a hole in a short piece of rod 112 sliding within the tube. By tightening the thumb screw 111 the short piece of rod 112 and the hub 110a are clamped against the wall of the tube 109 thereby holding the side guide in adjusted position. A tube 109a, similar to the tube 109, is mounted on the front end of plate 85 in the same fashion as tube 109, but no side guides are mounted on tube 109a as the side guides 46a in front of the platen are sufficient to guide the forms at the front end of a pack.

Adjustable stops are provided to limit the forward and retracting movements of carriage 85. A bar 113 which may be rectangular in section, has its ends turned and threaded to enter holes in the upturned front and rear edges of the plate comprising carriage 85. Nuts screwed on the threaded ends of bar 113 secure the latter in the holes in plate 85. The bar 113 has one edge provided with teeth and on the bar are slidably mounted the front and rear stops 114a, 114b. These stops may be substantially like those now used as marginal stops in the "International" electric writing machine shown in Patent No. 1,914,705. Each stop has a lug 114c which projects upwardly into the plane of the plate 85, so as to be engageable with the edges of this plate.

In front of the platen there is located a leading edge gage for determining the point at which the leading edges of the forms are held during the carbon stripping operation. This leading edge gage is shown in Figs. 1 and 2 and consists of a bracket 115 secured to the top surface of the cover 116 for the type basket of the typewriter. A rod 117 is mounted on the bracket 115 which extends into a slot cut in the rod 117 whereby the latter is rigidly supported at substantially its mid-point. Slidably mounted on rod 117 is an adjustable stop 118 which is secured to a hub 119 provided with a thumb screw 120. The top surface of the rod 117 is slightly flattened longitudinally while the hub 119 is slotted to permit the hub to pass the bracket 115, the flat on the rod in cooperation with the thumb screw 120 preventing the stop from rotating about the rod 117 as an axis outboard of the bracket 115.

The operation of the machine as a whole will be briefly described. It will be assumed that fanfolded forms are to be typed, which are, as is commonly the practice, folded in zig-zag fashion and placed in a suitable box or rack located beneath the overhanging portion of the plate 85 so as to be directly beneath tube 109. The forms are lead upwardly over the tube 109, between the side guides 110, and across the top of the bar 106. The carbon supporting blades 108 are slipped in the loops formed in the carbon sheets and stacked alternately upon the posts 107 so as to project into the folds of the fanfold webs whereby the first few sets of forms with interleaved carbons lie flat upon the plate 85 between the platen and the carbon shifting carriage, which, it will be assumed, is in its rearmost position.

The platen is now raised to the position of Fig. 5 by lifting the lever 24 and the leading edges of the forms are pulled forward until they abut the adjustable stop 118. The platen is then lowered to its normal position, shown in Fig. 4, which causes the first set of forms to be wrapped around the platen and gripped between the platen and feed rollers 34, 35. The operator may now rotate the platen knobs 18a, if necessary, to bring the first writing line on the first set of forms into position to be typed, and then proceeds with the typing of the first set of forms in the well known way. When the first set of forms is completed, the platen is raised by lifting the lever 24 and the operator grasps the leading edges of the first set of forms, holds them against the adjustable stop 118, and then pushes the carbon shifting carriage rearwardly until it strikes the stop 114, this movement being accomplished with the operator's left hand through the medium of the operating handle 102. The platen is now lowered to its normal position, the platen operating knob is turned to bring the line of perforations between the first and second sets of forms into cooperation with the rib 44a and the first set of forms is torn off.

The adjustable stop 114 is set to such a position that when the carbon sheets are retracted, the leading edges of the carbon sheets will fall far enough rearwardly of the leading edges of the forms to enable the operator to grasp the forms for the stripping operation without gripping the carbons. The adjustable stop 118 is preferably set to a position which will cause the line of perforations between a finished set of forms and the next set of forms to come into registry with rib 44a when the platen is dropped to normal position.

When the platen is raised for purposes of stripping the carbons, the pack of superposed forms and carbon sheets extends in a straight stretch from the adjustable stop 118 to the carbon blades 108 between the platen and the feed rollers 34, 35, whereby there is no binding action of the forms upon the carbon sheets. Only a very brief description of the operation of the machine has been given herein as the mode of operation of this type of machine is well known in the art.

Figure 9:
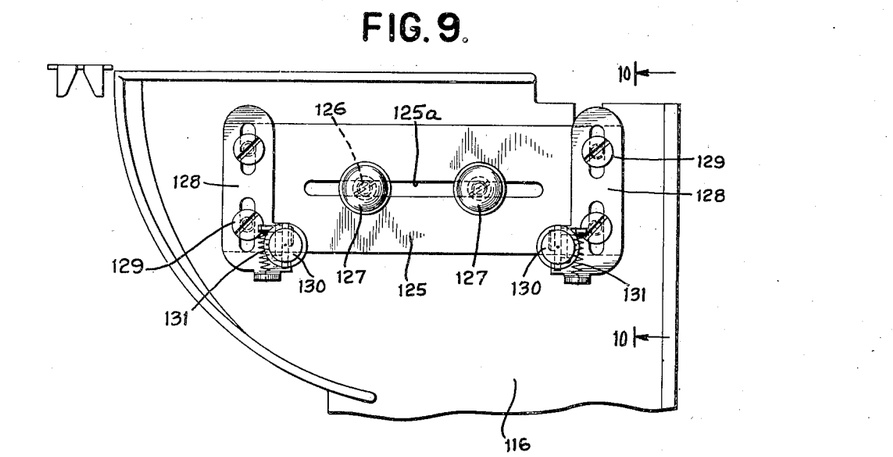
Fig. 9 is a plan view of the means for alining perforated continuous forms.
Figure 10:
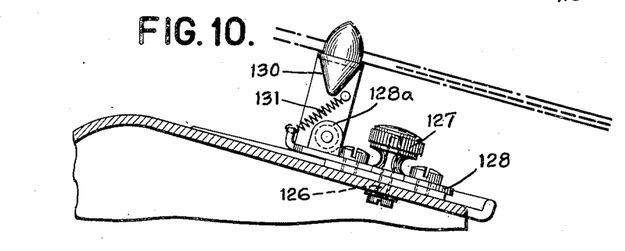
Fig. 10 is a vertical section on the line 10—10 of Fig. 9.

It is sometimes desired to use "Egry" forms in which there is usually provided a pair of holes adjacent the leading edges of the forms for the purpose of alining the forms and forcing them into registry prior to the typing operation. These holes are also sometimes used for purposes of binding the forms together in loose-leaf fashion after they have been typed. In order to use forms of this type, it is desirable to provide means cooperating with the holes for alining the forms. Such means is illustrated in Figs. 9 and 10 and may be substituted for the adjustable stop 118.

The alining means is mounted on a plate 125 having a slot 125a through which extends a pair of studs 126 screwed into suitable holes in the cover 116. Thumb screws 127 on the studs 126 provides a means for clamping the plate 125 in its adjusted position. The plate 125 extends transversely of the line of feed of the forms whereby the plate may be adjusted in the direction of the carriage movement. At each end of the plate 125 there is provided a bracket 128 which is attached to the plate 125 by means of screws 129 which extend through slots in the brackets 128 whereby the latter may be adjusted longitudinally of the line of feed of the forms. The brackets 128 have lugs 128a formed at right angles to the main part of the brackets and on these lugs are pivoted the alining pins 130. The upper ends of the alining pins have a bullet-shape so designed that the holes in the forms fit the ends of the pins slightly loosely, the pins being formed with a shoulder to support the superposed webs comprising a pack of forms, as shown in Fig. 10 by the dot-dash lines. The carbon sheet is shown by a dotted line. The alining pins 130 are pivoted on the lugs 128a at a point rearwardly of their longitudinal axes and springs 131, anchored to ears formed in the brackets 128 and to short pins on the pins 130, tend to hold the alining pins 130 in the position of Fig. 10 with the ends of said pins abutting the top surface of the bracket.

After a set of forms has been typed and the platen has been raised, the holes in the set of forms are slipped over the pins 130 and the forms are held by the operator until the carbon stripping operation has been completed. When the platen is to be lowered to its normal position, the operator releases his grasp on the forms and lowers the platen. As the platen descends, it exerts a certain amount of tension upon the forms, tending to draw them back underneath the platen thereby tilting the pins toward the platen, this movement being resisted, more or less, by the springs 131 which yield as the platen descends. Eventually, when the platen reaches its home position, the pins are tilted so far that the forms slip off the ends of the pins 130 and are drawn back to the position of Fig. 10 by springs 131. The effect of the pins is to hold the superposed forms in registry during the time that the platen is descending and the forms are held in registry until the platen engages the feed rollers 34, 35 and pushes them down somewhat.

While there has been shown and described and pointed out the fundamental novel features of the invention as applied to a single embodiment it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a continuous billing machine the combination with the carriage of a platen supporting frame movably mounted on the carriage and a platen rotatably mounted on said frame whereby the platen may be displaced upwardly and rearwardly of the carriage from a writing to an inactive position; movable means mounted on said frame for holding the platen supporting frame with the platen in its writing position; means to counterbalance the weight of the platen, its supporting frame and the holding means while the platen is being moved to inactive position; and a manual member movably mounted on said frame, said manual member being operable, by an initial movement thereof relative to the frame, to release the holding means mounted on said frame and thereafter operable to displace the platen and its supporting frame to an inactive position.

2. In a continuous billing machine, in combination with the carriage, a platen, movable means to mount the platen on the carriage to enable the platen to be displaced upwardly and rearwardly of the carriage from a writing to an inactive position, means on the carriage to limit movement of the platen from its writing to its inactive position; means to counterbalance the weight of the platen, said means also serving to hold the platen in its inactive position; a paper bail movably mounted on the carriage and cooperating with the platen; and manually releasable latching means movably mounted on said bail for holding the bail in cooperation with the platen when the latter is in writing position, said latching means being so constructed and arranged that it does not interfere with the displacing movement of the platen to an inactive position.

3. In a continuous billing machine the combination with the carriage of a platen, means to movably mount the platen in the carriage for movement from a writing to an inactive position, a form severing knife movably mounted on the carriage and extending in front of the platen, and releasable latching means movably mounted on the form severing knife for latching the severing knife in cooperation with the platen.

4. In a continuous billing machine, the combination with a carriage, a platen movably mounted in the carriage so as to be displaceable from a writing to an inactive position, a tearing knife movably mounted in front of the platen and cooperating therewith, means to latch the tearing knife in cooperation with the platen, said means being releasable to move the tearing knife out of cooperation with the platen to permit adjusting forms wrapped around the platen, and a pair of form guides adjustably mounted on the tearing knife.

5. In a continuous billing machine, in combination with the carriage, a pair of arms with their rear ends pivotally mounted at the rear of the carriage, a platen rotatably mounted on the forward ends of said arms, means movably mounted on said arms and engaging fixed parts of the carriage for holding the platen in a writing position and releasable to permit the platen to be displaced to an inactive position above the rear portion of the carriage, and a manual member pivotally mounted on one of said arms for operating the holding means, said manual member being initially movable to release the holding means and thereafter movable to displace the platen to the inactive position.

6. In a continuous billing machine, the combination with a carriage, of a platen movably mounted in the carriage for displacement from a writing to an inactive position, means cooperating with the platen when in its writing position to feed continuous forms having aligning perforations along their leading edges, and a plurality of aligning pins pivotally mounted independently of the carriage at the front thereof, said pins being resiliently mounted whereby they may move toward the platen and being adapted to cooperate with the aligning holes in the forms when the platen is in the inactive position and when the platen is lowered to writing position to tilt toward the platen while exerting tension to said forms to bring them into registry.

7. In combination with a carriage for a typewriting machine, a platen movably mounted in the carriage so as to be displaceable from a writing to an inactive position, a pair of aligning pins pivotally mounted independently of the carriage and at the front thereof so as to be capable of tilting in the general direction of movement of the platen to writing position, spring means to oppose such movement of the pins, means to limit restoring movement of the pins under the influence of said springs, said pins having their free ends adapted to register with holes in the leading edges of forms wrapped around the platen whereby when the platen is moved to writing position with said pins engaging said holes, said pins are tilted in the general direction of movement of the platen to writing position, said pins being so spaced with respect to the platen that when the platen reaches writing position the forms slip off the ends of the pins permitting the springs to restore said pins.

8. In a continuous billing machine having a carriage and a platen movably mounted in the carriage so as to be displaceable upwardly and rearwardly of the carriage from a writing to an inactive position to permit straightening of forms wrapped around the platen, a fixed leading edge gage mounted independently of the carriage and at the front side of the platen, said leading edge gage comprising a fixed mounting bracket, a rod rigidly supported by the bracket and extending forwardly with respect to the platen, and a stop slidably mounted on said rod so as to be movable away and toward the platen.

9. In combination with the carriage of a typewriter machine, a platen, feed rolls cooperating with the platen to feed work sheets, means to movably mount the platen on the carriage to permit displacement of the platen from a writing to an inactive position, a paper table carried by said mounting means and located at the delivery side of the platen, means to latch the platen in its writing position and means movably mounted on the mounting means for displacing the platen to its inactive position, said means being initially movable to disengage the latching means and thereafter movable to displace the platen to its inactive position.

10. In a typewriting machine, a carriage, a platen located at the front of the carriage, a movable platen support mounted on the carriage for moving the platen from a writing to an inactive position, a paper table mounted on said support and located at the delivery side of the platen, feed rolls mounted on the carriage substantially diametrically opposite the paper table and cooperating with the platen to feed work sheets, a manual operating lever mounted in said support and having limited movement relative to the support, and means operated by the relative movement of said manual member for latching the platen in its writing position.

11. In combination with the carriage of a typewriting machine, a platen located at the front side of the carriage, a paper bail pivotally mounted on the carriage and cooperating with the platen to engage a work sheet wrapped around the platen, feed rolls mounted on the carriage and cooperating with the platen to feed the work sheet wrapped around the platen, a paper table located at the delivery side of the platen above the paper bail for supporting the work sheet at the delivery side of the platen, means to movably mount the paper table and platen on the carriage to permit the platen to be moved away from its writing position to an inactive position, means for operating the supporting means to displace the platen to its inactive position, and releasable means for holding the paper bail in close proximity to the platen, said holding means being so constructed and arranged as to permit the platen to move freely and independently of said holding means to the inactive position, said holding means being manually disengageable when the platen is in the writing position to permit the paper bail to move away from the platen.

12. In combination with the carriage of a typewriting machine, a platen located at the front side of the carriage, feed rollers cooperating with the platen to feed a work sheet, a paper bail located at the front side of the platen and pivotally mounted in the carriage, said paper bail having means to sever a portion of a work sheet from the remainder of the work sheet, means to displace the platen upwardly and rearwardly of the carriage to permit the work sheet to be straightened above the paper bail, and means mounted on the paper bail for guiding the edges of the work sheet while it is being straightened.

13. In combination with the carriage of a typewriting machine, a pair of arms pivoted at the rear of the carriage and extending upwardly and forwardly to the front of the carriage, a platen rotatably mounted in the forward ends of said arms whereby the platen may be displaced upwardly and rearwardly of the carriage from a writing to an inactive position, means on said arms cooperating with a part of the carriage for holding the platen in its typing position, a release lever carried by said arms for releasing the latching means, said lever being initially operable to disengage the latching means and thereafter operable to move the platen to non-typing position, a paper table mounted in said arms at the delivery side of the platen, feed rollers mounted in the carriage cooperating with the platen when the latter is in its typing position, said platen becoming separated from the feed rollers when the platen is displaced to its inactive position to permit straightening a work sheet partially wrapped around the platen, and guides located at the delivery side of the platen for guiding the straightened work sheet when the platen is in its inactive position.

14. In combination with the carriage of a typewriting machine, a platen located at the front side of the carriage, means to movably mount the platen on the carriage whereby the platen may be displaced upwardly from a writing to an inactive position to enable work sheets wrapped around the platen to become stretched flat and platen rotating means comprising a feed ratchet located at one end of the platen and displaceable therewith and a ratchet actuated mechanism mounted in a carriage adjacent the ratchet and out of the plane of said ratchet, said actuating means including an actuating pawl, the bulk of which is located out of the plane of said ratchet, said pawl having an offset portion engaging the teeth of said ratchet when the platen is in its typing position, said ratchet and said pawl separating when the platen is displaced from inactive position.

15. In a continuous billing machine the combination with a carriage of a platen displaceably mounted on the carriage so as to be movable from a writing to an inactive position, form aligning pins mounted independently of the carriage located at the front of the platen, said pins having portions thereof on which continuous forms may be impaled while the platen is in its inactive position and means for adjustably movably mounting said pins at the front of the platen whereby, while the platen is being restored to its writing position, said pins move with and become operative to hold in alignment forms impaled thereon.

16. In a continuous billing machine, in combination with a carriage, a platen rotatably and adjustably mounted on the carriage for movement from a writing to an inactive position to permit a pack of continuous forms wrapped around the platen to become drawn through a straight stretch, said forms being provided with form registering perforations, aligning means movably mounted at the front of the platen and upon which the forms may be impaled by means of said registering perforations in the forms when the platen is raised and the forms are drawn into a straight stretch, and means to movably mount the aligning means whereby, when the platen is restored to its typing position, tension is applied to the forms by the aligning means to draw the forms into alignment, said mounting means being so constructed and arranged as to allow the aligning means to tilt and become automatically disengaged from the forms when the platen arrives in its writing position, said disengagement being effected as a consequence of the tension on the forms.

17. The combination with the carriage of a typewriting machine, typing means, a platen, means to mount the platen on the carriage to enable the platen to be displaced from a writing position to an inactive position in which forms wrapped around the platen may be stretched out flat for the purpose of manipulating the forms, a paper bail confronting the platen when in its writing position to hold the papers wrapped around the platen free of the typing means, and means for holding the paper bail in cooperation with the platen, said means being disengaged automatically when the platen is moved to inactive position, said holding means being manually disengageable when the platen is in its writing position to move the paper bail out of cooperation with the platen.

18. In a continuous billing machine, in combination with the carriage, a platen, means to movably mount the platen on the carriage to enable the platen to be displaced from a writing position to an inactive position, a forms severing knife movably mounted on the carriage and cooperating with the platen to hold work sheets wrapped around the platen, and manually operable means interconnecting the platen and the forms severing knife to hold the forms severing knife in cooperation with the platen during the writing of a form, said holding means being so constructed and arranged as to be releasable to permit the forms severing knife to be moved out of cooperation with the platen when the latter is in its writing position and adapted to permit the platen to be displaced to inactive position, said holding means being automatically engaged when the platen is restored to writing position.

19. The combination with the carriage of a typewriting machine, typing means, a platen, means to mount the platen on the carriage to enable the platen to be displaced from a writing position to an inactive position in which forms wrapped around the platen may be stretched out flat for the purpose of manipulating the forms, a forms severing knife confronting the platen when in its writing position to hold the papers wrapped around the platen free of the typing means, and means for holding the forms severing knife in cooperation with the platen, said means being normally operative when the platen is in its writing position and being disengaged automatically when the platen is moved to inactive position, said holding means being manually disengageable when the platen is in its writing position to move the forms severing knife out of cooperation with the platen.

20. In a continuous billing machine, in combination with the carriage, a platen, means to movably mount the platen on the carriage to enable the platen to be displaced from a writing position to an inactive position, a paper bail movably mounted on the carriage and cooperating with the platen to hold work sheets wrapped around the platen, and manually releasable means for holding the paper bail in cooperation with the platen during the writing of a form, said holding means being so constructed and arranged as to be releasable to permit the paper bail to be moved out of cooperation with the platen when it is in its writing position and adapted to permit the platen to be raised to inactive position, said holding means being automatically reengaged when the platen is restored to writing position.

21. In a machine for typing manifold forms having register perforations, the combination with a carriage, a platen movably mounted on the carriage for displacement from a writing to an inactive position to permit a pack of said forms wrapped around the platen to be straightened as a preliminary effecting a relative shifting movement between carbon sheets and the forms, a form aligning device including means engageable with the register perforations in the forms to hold the forms into alignment, means for movably mounting the aligning device in front of the platen, said mounting means being adapted to permit the form engaging means to tilt toward the platen when the platen is restored to the writing position to permit forms to become disengaged from the aligning device, said tilting of the aligning device being effected by tension produced in the forms in consequence of the movement of the platen to the writing position.

CHARLES H. BEIDERBECKE.

CERTIFICATE OF CORRECTION.

Patent No. 2,199,535.  May 7, 1940.

CHARLES H. BEIDERBECKE.

It is hereby certified that error appears in the printed specification of the above numbered patent requiring correction as follows: Page 7, first column, line 15, claim 13, for the word "means" read --movable latching means mounted--; and that the said Letters Patent should be read with this correction therein that the same may conform to the record of the case in the Patent Office.

Signed and sealed this 11th day of June, A. D. 1940.

(Seal)
Henry Van Arsdale,
Acting Commissioner of Patents.